United States Patent
Akiyama

(10) Patent No.: US 11,531,260 B2
(45) Date of Patent: Dec. 20, 2022

(54) ILLUMINATION DEVICE AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/380,334

(22) Filed: Jul. 20, 2021

(65) Prior Publication Data
US 2022/0026788 A1    Jan. 27, 2022

(30) Foreign Application Priority Data

Jul. 21, 2020   (JP) .............................. JP2020-124260

(51) Int. Cl.
*G03B 21/20*   (2006.01)
*G02B 27/28*   (2006.01)
*G03B 33/12*   (2006.01)

(52) U.S. Cl.
CPC ......... *G03B 21/204* (2013.01); *G02B 27/283* (2013.01); *G03B 21/2013* (2013.01); *G03B 21/2073* (2013.01); *G03B 33/12* (2013.01)

(58) Field of Classification Search
CPC .. G03B 21/204; G03B 21/2037; G03B 33/12; G02B 27/283
USPC .......................................................... 353/20
See application file for complete search history.

(56) References Cited

U.S. PATENT DOCUMENTS

| | | | |
|---|---|---|---|
| 2012/0268917 A1 | 10/2012 | Kitano et al. | |
| 2016/0353069 A1 | 12/2016 | Chikahisa | |
| 2017/0153538 A1 | 6/2017 | Kawasumi | |
| 2019/0391473 A1 | 12/2019 | Uchiyama | |
| 2020/0103737 A1* | 4/2020 | Kawasumi | G02B 27/102 |

FOREIGN PATENT DOCUMENTS

| | | |
|---|---|---|
| CN | 110632815 A | 12/2019 |
| JP | 2012-234161 A | 11/2012 |
| JP | 2016-224304 A | 12/2016 |
| JP | 2017-097310 A | 6/2017 |
| JP | 2017-194523 A | 10/2017 |
| JP | 2020-052236 A | 4/2020 |

* cited by examiner

*Primary Examiner* — Jerry L Brooks
(74) *Attorney, Agent, or Firm* — Oliff PLC

(57) ABSTRACT

An illumination device includes a first light emitting element emitting first light in a first wavelength band, a wavelength conversion element converting a part of the first light into second light including a second wavelength band and a third wavelength band, diffusing another part of the first light, and emitting a result, a second light emitting element for emitting third light having the second wavelength band, a first optical element having a first area for reflecting the first light to enter the wavelength conversion element, reflecting fourth light having the second wavelength band out of the second light, and reflecting the third light, and a second area for transmitting the first light and the second light, and a second optical element for transmitting the first light to enter the first optical element, and reflecting the fourth light to enter the wavelength conversion element via the first area.

10 Claims, 7 Drawing Sheets

ILLUMINATION DEVICE AND PROJECTOR

The present application is based on, and claims priority from JP Application Serial Number 2020-124260, filed Jul. 21, 2020, the disclosure of which is hereby incorporated by reference herein in its entirety.

BACKGROUND

1. Technical Field

The present disclosure relates to an illumination device and a projector.

2. Related Art

There is a technology of generating white light by combining a blue laser beam and yellow fluorescence generated by the excitation with the blue laser beam with each other as an illumination device used for a projector (see, e.g., JP-A-2017-194523). Since the yellow fluorescence lacks a red component, it has been difficult to optimize the white balance of the white light emitted from the illumination device described above. To cope with the above, there is an illumination device which adds red light emitted from a red light source to the yellow fluorescence to thereby generate the white light (see, e.g., JP-A-2020-052236).

In the illumination device described above, since a combining element for combining the red light is disposed on a light path of the fluorescence, the red component included in the fluorescence is reflected by the combining element to fail to be used, and thus, the use efficiency of the fluorescence decreases.

SUMMARY

In view of the problems described above, according to a first aspect of the present disclosure, there is provided an illumination device including a first light emitting element for emitting first light in a first wavelength band, a wavelength conversion element configured to convert a part of the first light into second light having a second wavelength band different from the first wavelength band and a third wavelength band different from the first wavelength band and the second wavelength band, diffuse another part of the first light, and emit a result, a second light emitting element configured to emit third light having the second wavelength band, a first optical element having a first area configured to reflect the first light to enter the wavelength conversion element, reflect fourth light having the second wavelength band out of the second light, and reflect the third light, and a second area configured to transmit the first light, and transmit the second light, and a second optical element configured to transmit the first light to enter the first optical element, and reflect the fourth light to enter the wavelength conversion element via the first area.

According to a second aspect of the present disclosure, there is provided an illumination device including a first light emitting element for emitting first light in a first wavelength band, a wavelength conversion element configured to convert a part of the first light into second light having a second wavelength band different from the first wavelength band and a third wavelength band different from the first wavelength band and the second wavelength band, diffuse another part of the first light, and emit a result, a second light emitting element configured to emit third light having the second wavelength band, a first optical element having a first area configured to transmit the first light to enter the wavelength conversion element, transmit fourth light having the second wavelength band out of the second light, and transmit the third light, and a second area configured to reflect the first light, and reflect the second light, and a second optical element configured to transmit the first light to enter the first optical element, and reflect the fourth light to enter the wavelength conversion element via the first area.

According to a third aspect of the present disclosure, there is provided a projector including the illumination device according to the first aspect or the second aspect of the present disclosure, a light modulation device configured to modulate light from the illumination device in accordance with image information, and a projection optical device configured to project the light modulated by the light modulation device.

DESCRIPTION OF EXEMPLARY EMBODIMENTS

First Embodiment

Figure 1:
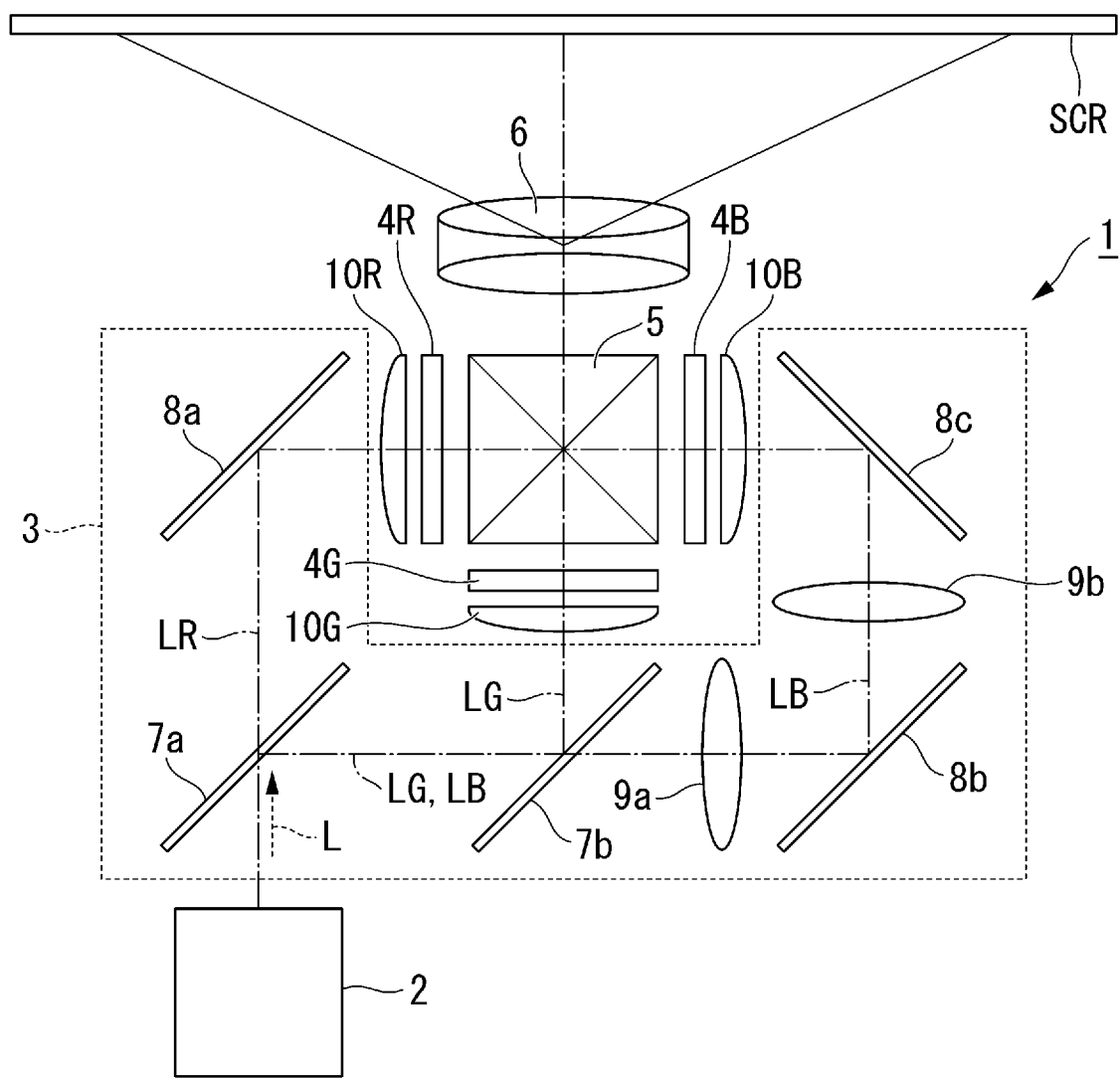
FIG. 1 is a schematic configuration diagram of a projector according to a first embodiment.

A first embodiment of the present disclosure will hereinafter be described using the drawings.

In the drawings described below, the constituents are shown with respective scale ratios of the sizes different from each other in some cases in order to make the constituents eye-friendly.

An example of a projector according to the present embodiment will be described.

FIG. 1 is a schematic configuration diagram of the projector according to the present embodiment.

As shown in FIG. 1, the projector 1 according to the present embodiment is a projection-type image display device for displaying a color image on a screen SCR. The projector 1 is provided with an illumination device 2, a color separation optical system 3, a light modulation device 4R, a light modulation device 4G, a light modulation device 4B, a combining optical system 5, and a projection optical device 6. A configuration of the illumination device 2 will be described later.

The color separation optical system 3 is provided with a first dichroic mirror 7a, a second dichroic mirror 7b, a reflecting mirror 8a, a reflecting mirror 8b, a reflecting mirror 8c, a relay lens 9a, and a relay lens 9b. The color separation optical system 3 separates illumination light L emitted from the illumination device 2 into red light LR, green light LG, and blue light LB, and then guides the red light LR to the light modulation device 4R, guides the green light LG to the light modulation device 4G, and guides the blue light LB to the light modulation device 4B.

A field lens 10R is disposed between the color separation optical system 3 and the light modulation device 4R, and substantially collimates the incident light and then emits the result toward the light modulation device 4R. A field lens 10G is disposed between the color separation optical system 3 and the light modulation device 4G, and substantially collimates the incident light and then emits the result toward the light modulation device 4G. A field lens 10B is disposed between the color separation optical system 3 and the light modulation device 4B, and substantially collimates the incident light and then emits the result toward the light modulation device 4B.

The first dichroic mirror 7a transmits a red light component, and reflects a green light component and a blue light component. The second dichroic mirror 7b reflects the green light component, and transmits the blue light component. The reflecting mirror 8a reflects the red light component. The reflecting mirror 8b and the reflecting mirror 8c reflect the blue light component.

The red light LR transmitted through the first dichroic mirror 7a is reflected by the reflecting mirror 8a, and is then transmitted through the field lens 10R to enter an image formation area of the light modulation device 4R for the red light. The green light LG reflected by the first dichroic mirror 7a is further reflected by the second dichroic mirror 7b, and then transmitted through the field lens 10G to enter an image formation area of the light modulation device 4G for the green light. The blue light LB transmitted through the second dichroic mirror 7b enters an image formation area of the light modulation device 4B for the blue light via the relay lens 9a, the reflecting mirror 8b at the incident side, the relay lens 9b, the reflecting mirror 8c at the exit side, and the field lens 10B.

The light modulation device 4R, the light modulation device 4G, and the light modulation device 4B each modulate the colored light having entered the light modulation device in accordance with image information to thereby form image light. The light modulation device 4R, the light modulation device 4G, and the light modulation device 4B are each formed of a liquid crystal light valve. Although not shown in the drawings, at the light incident side of each of the light modulation device 4R, the light modulation device 4G, and the light modulation device 4B, there is disposed an incident side polarization plate. At the light exit side of each of the light modulation device 4R, the light modulation device 4G, and the light modulation device 4B, there is disposed an exit side polarization plate.

The combining optical system 5 combines the image light emitted from the light modulation device 4R, the image light emitted from the light modulation device 4G, and the image light emitted from the light modulation device 4B with each other to form full-color image light. The combining optical system 5 is formed of a cross dichroic prism having four rectangular prisms bonded to each other to have a substantially square shape in the plan view. On the interfaces having a substantially X shape on which the rectangular prisms are bonded to each other, there are formed dielectric multilayer films.

The image light emitted from the combining optical system 5 is projected by the projection optical device 6 in an enlarged manner to form an image on the screen SCR. In other words, the projection optical device 6 projects the light modulated by the light modulation device 4R, the light modulated by the light modulation device 4G, and the light modulated by the light modulation device 4B. The projection optical device 6 is constituted by a plurality of projection lenses.

An example of the illumination device 2 according to the present embodiment will be described.

Figure 2:
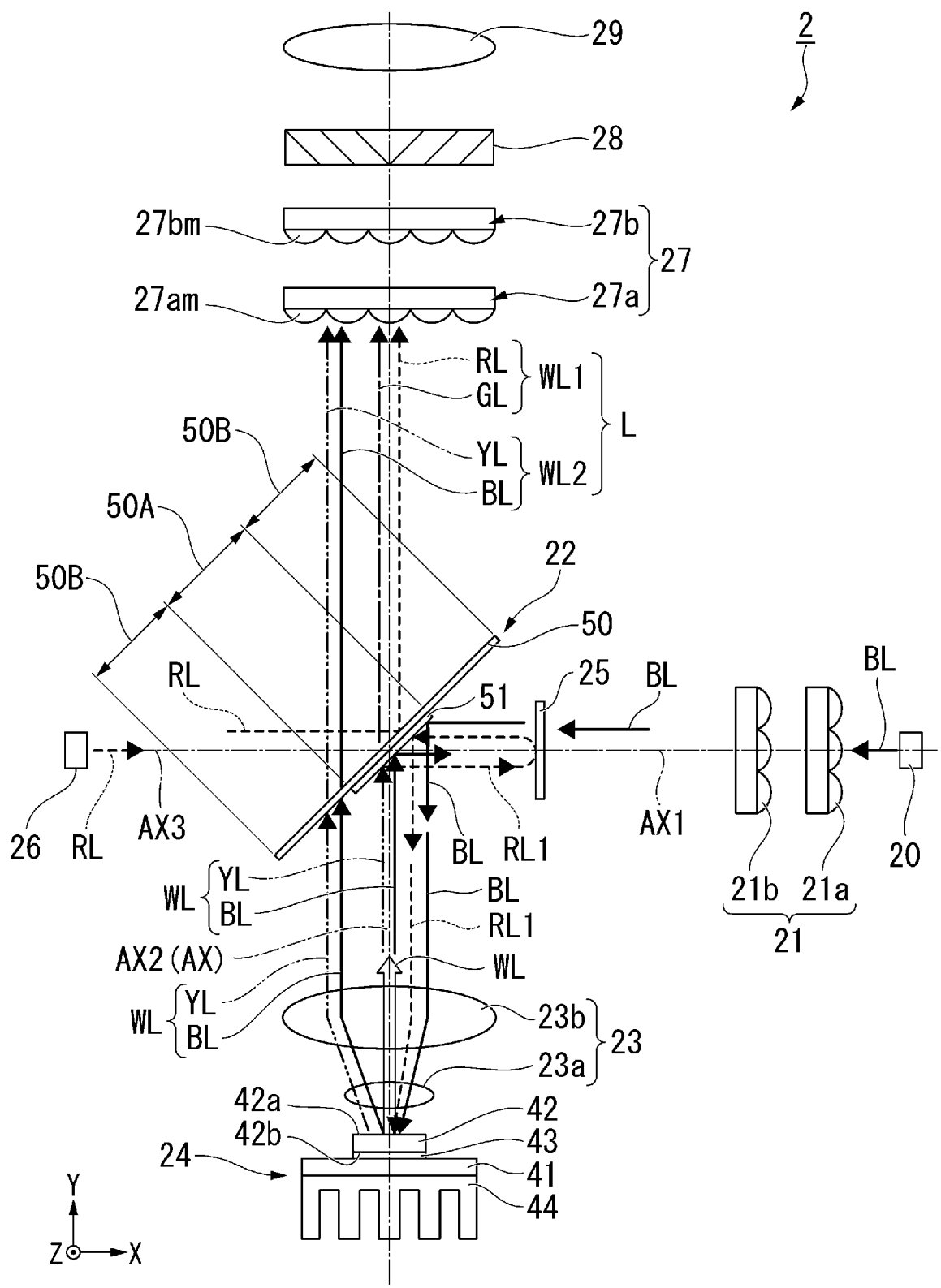
FIG. 2 is a schematic configuration diagram of an illumination device according to the first embodiment.

FIG. 2 is a schematic configuration diagram of the illumination device 2.

As shown in FIG. 2, the illumination device 2 according to the present embodiment is provided with a first light emitting element 20, a homogenizer optical system 21, a first optical element 22, a pickup optical system 23, a wavelength conversion element 24, a second optical element 25, a second light emitting element 26, an integrator optical system 27, a polarization conversion element 28, and a superimposing lens 29.

Hereinafter, using an XYZ orthogonal coordinate system, an axis parallel to a principal ray of blue light BL emitted from the first light emitting element 20 is defined as an X axis, an axis parallel to a principal ray of fluorescence YL emitted from the wavelength conversion element 24 is defined as a Y axis, and an axis perpendicular to the X axis and the Y axis is defined as a Z axis.

Further, an axis extending along the principal ray of the blue light BL is referred to as an optical axis AX1 of the first light emitting element 20. Therefore, the optical axis AX1 of the first light emitting element 20 is parallel to the X axis. An axis extending along the principal ray of the fluorescence YL is referred to as an optical axis AX2 of the wavelength conversion element 24. Therefore, the optical axis AX2 of the wavelength conversion element 24 is parallel to the Y axis. In the present embodiment, the optical axis AX2 coincides with an illumination optical axis AX of the illumination device 2.

In the present embodiment, the first light emitting element 20, the homogenizer optical system 21, the second optical element 25, the second light emitting element 26, and the first optical element 22 are disposed on the optical axis AX1. The wavelength conversion element 24, the pickup optical system 23, the first optical element 22, the integrator optical system 27, the polarization conversion element 28, and the superimposing lens 29 are disposed on the optical axis AX2.

The first light emitting element 20 is formed of at least one blue semiconductor laser, and emits the blue light BL. The blue semiconductor laser emits the blue light (first light) BL in a first wavelength band having a peak wavelength in a range of, for example, 380 nm through 490 nm. The blue light BL emitted from the blue semiconductor laser is linearly-polarized light polarized in a predetermined direction.

The second light emitting element 26 is formed of at least one red LED, and emits red light RL. The red LED emits the red light (third light) RL in a second wavelength band having a peak wavelength in a range of, for example, 600 nm through 800 nm. In the present embodiment, the red light RL emitted from the second light emitting element 26 enters the first optical element 22 as a parallel light beam. It should be noted that the red light RL emitted from the red LED is randomly-polarized light having no particular polarization direction.

Here, an axis extending along a principal ray of the red light RL is referred to as an optical axis AX3 of the second light emitting element 26. The optical axis AX3 of the second light emitting element 26 is parallel to the X axis. In the present embodiment, the optical axis AX3 of the second light emitting element 26 coincides with the optical axis AX1 of the first light emitting element 20.

The blue light BL emitted from the first light emitting element 20 enters the homogenizer optical system 21 as a parallel light beam. It should be noted that an afocal optical system is disposed between the first light emitting element 20 and the homogenizer optical system. 21 to reduce the flux diameter of the blue light BL as needed. By reducing the flux diameter of the blue light BL with the afocal optical system, it is possible to reduce the size of the homogenizer optical system 21.

The homogenizer optical system 21 converts the illuminance distribution of the pencil into a uniform distribution, namely a so-called top-hat distribution, in an illumination target area. The homogenizer optical system 21 is constituted by a first multi-lens array 21a and a second multi-lens array 21b.

The blue light BL having passed through the homogenizer optical system 21 enters the second optical element 25. The second optical element 25 is formed of a dichroic mirror. The dichroic mirror forming the second optical element 25 has a characteristic of transmitting light in a blue wavelength band while reflecting light in a red wavelength band. The second optical element 25 transmits the blue light BL to enter the first optical element 22.

The blue light BL transmitted through the second optical element 25 enters the first optical element 22. The first optical element 22 is disposed so as to form an angle of 45° with each of the illumination optical axis AX and the optical axis AX1, and the optical axis AX3 and the optical axis AX2. The first optical element 22 reflects the blue light BL toward the wavelength conversion element 24. A configuration of the first optical element 22 will be described later.

The blue light BL reflected by the first optical element 22 enters the pickup optical system 23. The pickup optical system 23 is disposed between the optical element 22 and the wavelength conversion element 24. The pickup optical system 23 is constituted by two convex lenses formed of a first lens 23a and a second lens 23b. It should be noted that the number of the lenses constituting the pickup optical system 23 is not particularly limited. The pickup optical system 23 collects the blue light BL reflected by the first optical element 22, and makes the result enter the wavelength conversion element 24.

The wavelength conversion element 24 is provided with a base member 41, a wavelength conversion layer 42, a reflecting layer 43, and a heatsink 44. In the present embodiment, the wavelength conversion layer 42 is formed of a phosphor. As the wavelength conversion element 24 in the present embodiment, there is used a reflective type wavelength conversion element which is not made rotatable due to a motor or the like.

The wavelength conversion layer 42 has a first surface 42a which the blue light BL enters, and a second surface 42b different from the first surface 42a. The wavelength conversion layer 42 is held by the base member 41 via a bonding material (not shown). As the bonding material, there is used, for example, a nano-silver sintered metal material. The wavelength conversion layer 42 is formed of, for example, a sintered body obtained by sintering an yttrium aluminum garnet (YAG) type phosphor.

The wavelength conversion element 24 performs the wavelength conversion of the blue light BL into fluorescence YL in a third wavelength band different from the first wavelength band. The fluorescence YL is yellow light having a peak wavelength in a range of, for example, 495 through 800 nm. The fluorescence (second light) YL is light including a red component in the second wavelength band (600 through 800 nm) different from the first wavelength band (380 nm through 490 nm), and a green component in the third wavelength band which is different from the first wavelength band and the second wavelength band, and has a peak wavelength in a range of, for example, 495 through 570 nm. It should be noted that the fluorescence YL is unpolarized light or non-polarized light having no particular polarization direction.

The phosphor constituting the wavelength conversion layer 42 in the present embodiment includes a scattering element for scattering the light inside. As the scattering element, there is used, for example, a plurality of air holes. Due to the configuration described above, a part of the blue light BL having entered the wavelength conversion element 24 is converted in wavelength by the wavelength conversion layer 42 into the fluorescence YL. Meanwhile, another part of the blue light BL is scattered by the scattering element before converted in wavelength into the fluorescence YL, and then emitted outside the wavelength conversion element 24 without being converted in wavelength. On this occasion, the blue light BL is emitted from the wavelength conversion element 24 in a state of being diffused into an angular distribution substantially the same as the angular distribution of the fluorescence YL.

The reflecting layer 43 is disposed on the second surface 42b of the wavelength conversion layer 42. The reflecting layer 43 is disposed between the base member 41 and the wavelength conversion layer 42. The blue light BL and the fluorescence YL entering the reflecting layer 43 from the wavelength conversion layer 42 are reflected by the reflecting layer 43 toward the pickup optical system 23. The reflecting layer 43 is formed of a laminated film including, for example, a dielectric multilayer film, a metal mirror, and a reflection enhancing film. Further, the reflecting layer 43 can be formed of a multilayer film including, for example, a dielectric multilayer film, a metal mirror, and a reflection enhancing film.

The heatsink 44 has a plurality of fins. The heatsink 44 is disposed so as to be opposed to the wavelength conversion layer 42 across the base member 41. The heatsink 44 is fixed to the base member 41 with, for example, metal bonding. In the wavelength conversion element 24, since heat radiation can be achieved through the heatsink 44, the heat deterioration of the wavelength conversion layer 42 can be prevented.

As described hereinabove, the wavelength conversion element 24 in the present embodiment converts a part of the blue light BL into the fluorescence YL as the yellow light, diffuses another part of the blue light BL, and emits the result. In other words, the wavelength conversion element 24 emits light WL having a white color and including the blue light BL and the fluorescence YL toward the pickup optical system 23. The blue light BL and the fluorescence YL emitted from the wavelength conversion element 24 are collimated by the pickup optical system 23, and then enter the first optical element 22.

The first optical element 22 has a transparent substrate 50 having a light transmissive property, and a dichroic mirror 51 disposed on one surface of the transparent substrate 50. It should be noted that it is possible to form an AR coating film on a surface of the transparent substrate 50 as needed.

The first optical element 22 in the present embodiment includes a first area 50A and a second area 50B. The first area 50A is formed of a region where the dichroic mirror 51 is disposed out of the transparent substrate 50, and the second area 50B is formed of a region where the dichroic mirror 51 is not disposed out of the transparent substrate 50.

The first area 50A is disposed at the center of the first optical element 22 where the illumination optical axis and the optical axis AX1, and the optical axis AX3 and the optical axis AX2 cross each other. The second area 50B is disposed in an outer rim portion of the first optical element 22 so as to surround the periphery of the first area 50A.

The dichroic mirror 51 has a characteristic of reflecting the light in the blue wavelength band and the light in the red wavelength band while transmitting the light in the yellow wavelength band. Therefore, the dichroic mirror 51 reflects the blue light BL emitted from the first light emitting element 20 and the red light RL emitted from the second light emitting element 26.

In the present embodiment, the first light emitting element 20 and the second light emitting element 26 are disposed so as to be opposed to each other across the first area 50A of the first optical element 22. In other words, the first light emitting element 20 and the second light emitting element 26, and the first area 50A are arranged side by side in a straight line. By adopting such a layout, since the first area 50A is disposed on the principal ray of the light emitted from the first light emitting element 20 and the principal ray of the light emitted from the second light emitting element 26, the size of the first area 50A is reduced.

Further, in the first light emitting element 20 in the present embodiment, the first area 50A which the light emitted from the first light emitting element 20 and the light emitted from the second light emitting element 26 are made enter is disposed at the center of the first optical element 22. According to this configuration, it is possible to simplify the configuration of the first light emitting element 20 and the second light emitting element 26 compared to when adopting a structure in which the second area 50B is disposed at the center of the first optical element 22.

In the present embodiment, the outer rim portion of the light WL including the fluorescence YL and the blue light BL which are emitted from the wavelength conversion element 24, and then collimated by the pickup optical system 23 enters the second area 50B of the first optical element 22. Since the second area 50B which is not provided with the dichroic mirror 51 is formed of the transparent substrate 50, the blue light BL and the fluorescence YL are transmitted through the second area 50B.

In contrast, the central portion of the light WL which has been emitted from the wavelength conversion element 24, and has been collimated by the pickup optical system 23 enters the dichroic mirror 51 provided to the first area 50A of the first optical element 22. The blue light BL included in the light WL emitted from the wavelength conversion element 24 is reflected by the dichroic mirror 51 toward the first light emitting element 20.

In the present embodiment, the fluorescence YL as the light WL emitted from the wavelength conversion element 24 is the light including the red component in the second wavelength band and the green component in the third wavelength band as described above. Hereinafter, the light of the red component having the second wavelength band out of the fluorescence YL is referred to as red light (fourth light) RL1, and the light of the green component having the third wavelength band out of the fluorescence YL is referred to as green light GL.

In the present embodiment, the dichroic mirror 51 reflects the red light RL in the second wavelength band emitted from the second light emitting element 26, and therefore similarly reflects the red light RL1.

Therefore, the blue light BL and the red light RL1 included in the central portion of the light WL emitted from the wavelength conversion element 24 are reflected by the first area 50A of the first optical element 22. It should be noted that the green light GL out of the fluorescence YL included in the central portion of the light WL is transmitted through the first area 50A of the first optical element 22.

The blue light BL and the red light RL1 reflected by the first area 50A enter the second optical element 25. The second optical element 25 is disposed between the first optical element 22 and the homogenizer optical system 21.

As described above, the second optical element 25 has a characteristic of transmitting the light in the blue wavelength band and reflecting the light in the red wavelength band. Therefore, the second optical element 25 reflects the red light RL1 to enter the first area 50A of the first optical element 22. The red light RL1 reflected by the second optical element 25 is reflected by the dichroic mirror 51 provided to the first area 50A, and is then collected by the pickup optical system 23, and then enters the wavelength conversion element 24. Therefore, the second optical element 25 reflects the red light RL1 to enter the wavelength conversion element 24 via the first area 50A. The red light RL1 having returned to the wavelength conversion element 24 is scattered by the scattering element included in the wavelength conversion layer 42 to thereby be changed in proceeding direction, and is then emitted once again from the wavelength conversion element 24, and then passes through the second area 50B of the first optical element 22 to thereby be reused. Further, the red light RL1 having returned to the wavelength conversion element 24 has no chance of being absorbed or converted in wavelength by the wavelength conversion layer 42. Since the red light RL1 having retuned to the wavelength conversion element 24 is reused as the illumination light as described hereinabove, it is possible to reduce occurrence of a light loss.

Meanwhile, the blue light BL having entered the second optical element 25 is transmitted through the second optical element 25 to return toward the first light emitting element 20. On this occasion, by making the size of the dichroic mirror 51 small in advance, it is possible to reduce the blue light BL which is reflected by the dichroic mirror 51 to return toward the first light emitting element 20 to thereby become the loss.

As described hereinabove, the illumination device 2 according to the present embodiment emits the light WL1 which has a yellow color, and includes the red light RL and the green light GL from the first area 50A of the first optical element 22 toward the integrator optical system 27, and emits the light WL2 which has a white color, and includes the fluorescence YL and the blue light BL from the second area 50B of the first optical element 22 toward the integrator optical system 27. Hereinafter, the light WL1 and the light WL2 are collectively referred to as the illumination light L.

By using the red light RL emitted from the second light emitting element 26 for the illumination light L, it is possible for the illumination device 2 according to the present embodiment to generate and emit the illumination light L supplemented with the red component which the illumination light L is lacking in with the fluorescence YL having a yellow color alone.

In the illumination device 2 according to the present embodiment, the red light RL is located at the center of the illumination light L. Therefore, even when a variation supposedly occurs in the parallelism of the red light RL, the red light RL efficiently enters the integrator optical system 27, and therefore, it is possible to make the red light RL efficiently enter an optical system in the posterior stage. Therefore, it is possible to efficiently use the red light RL.

The integrator optical system 27 has a first multi-lens array 27a, and a second multi-lens array 27b. The first multi-lens array 27a has a plurality of first lenses 27am for dividing the illumination light L into a plurality of partial light beams.

A lens surface of the first multi-lens array 27a, namely surfaces of the first lenses 27am, and the image formation area of each of the light modulation devices 4R, 4G, and 4B are conjugated with each other. Therefore, the shape of each of the first lenses 27am is a rectangular shape as a substantially similar shape to the shape of the image formation area of each of the light modulation devices 4R, 4G, and 4B when viewed from the direction of the optical axis AX2. Thus, each of the partial light beams emitted from the first multi-lens array 27a efficiently enters the image formation area of each of the light modulation devices 4R, 4G, and 4B.

The second multi-lens array 27b has a plurality of second lenses 27bm corresponding respectively to the first lenses 27am of the first multi-lens array 27a. The second multi-lens array 27b forms an image of each of the first lenses 27am of the first multi-lens array 27a in the vicinity of the image formation area of each of the light modulation devices 4R, 4G, and 4B in cooperation with the superimposing lens 29.

The illumination light L having been transmitted through the integrator optical system 27 enters the polarization conversion element 28. The polarization conversion element 28 has a configuration in which polarization split films and wave plates not shown are arranged in an array. The polarization conversion element 28 uniforms the polarization direction of the illumination light L into a predetermined direction. Specifically, the polarization conversion element 28 uniforms the polarization direction of the illumination light L into a direction of a transmission axis of the incident side polarization plate of each of the light modulation devices 4R, 4G, and 4B.

Thus, the polarization direction of the red light LR, the green light LG, and the blue light LB separated from the illumination light L having been transmitted through the polarization conversion element 28 coincides with the transmission axis direction of the incident side polarization plate of each of the light modulation devices 4R, 4G, and 4B. Therefore, the red light LR, the green light LG, and the blue light LB enter the image formation areas of the light modulation devices 4R, 4G, and 4B, respectively, without being blocked by the incident side polarization plates, respectively.

In the present embodiment, the red light included in the illumination light L is constituted by a red fluorescence component of the fluorescence YL and the red light RL. When the red fluorescence component of the fluorescence YL and the red light RL supposedly enter the polarization conversion element 28 in a state of being different in polarization state, there is a possibility that a difference in light emission distribution between the red fluorescence component and the red light RL emitted from the polarization conversion element 28 occurs to thereby cause a color variation. In contrast, in the illumination device 2 according to the present embodiment, the fluorescence YL is unpolarized light or non-polarized light, and the LED for emitting randomly-polarized light is used as the second light emitting element 26 for emitting the red light RL. Therefore, the fluorescence YL and the red light RL enter the polarization conversion element 28 as light beams substantially the same in polarization state in terms of the state having no particular polarization direction. Therefore, it is possible to prevent the color variation described above from occurring.

The illumination light L having been transmitted through the polarization conversion element 28 enters the superimposing lens 29. The superimposing lens 29 homogenizes the illuminance distribution in the image formation area of each of the light modulation devices 4R, 4G, and 4B as an illumination target area in cooperation with the integrator optical system 27.

Advantages of First Embodiment

The illumination device 2 according to the present embodiment is provided with the first light emitting element 20 for emitting the blue light BL in the first wavelength band, the wavelength conversion element 24 which converts a part of the blue light BL into the fluorescence YL including the red component in the second wavelength band different from the first wavelength band and the green component in the third wavelength band different from the first wavelength band and the second wavelength band, diffuses another part of the blue light BL, and then emits the result, the second light emitting element 26 for emitting the red light RL having the second wavelength band, the first optical element 22 having the first area 50A which reflects the blue light BL to enter the wavelength conversion element 24, reflects the red light RL1 having the second wavelength band out of the fluorescence YL, and reflects the red light RL, and the second area 50B for transmitting the blue light BL and the fluorescence YL, and the second optical element 25 which transmits the blue light BL to enter the first optical element 22, and reflects the red light RL1 to enter the wavelength conversion element 24 via the first area 50A.

According to the illumination device 2 having the configuration described above, by using the red light RL emitted from the second light emitting element 26 for the illumination light L, it is possible to generate the illumination light L having a white color and supplemented with the red component which the illumination light L is lacking in with the fluorescence YL alone. Therefore, it is possible to generate the illumination light L high in color reproducibility. Further, in the illumination device 2, the red light RL1 included in the fluorescence YL reflected by the first area 50A can be reflected by the second optical element 25 to be returned to the wavelength conversion element 24. The red light RL1 having returned to the wavelength conversion element 24 is scattered by the scattering element included in the wavelength conversion layer 42 to thereby be changed in proceeding direction, and is then emitted once again from the wavelength conversion element 24, and then passes through the second area 50B of the first optical element 22 to thereby be reused. Further, the red light RL1 having returned to the wavelength conversion element 24 has no chance of being absorbed or converted in wavelength by the wavelength conversion layer 42. By reusing the red light RL1 as the illumination light L as described hereinabove, it is possible to increase the light use efficiency of the fluorescence YL.

In illumination device 2 according to the present embodiment, the first area 50A is disposed at the center of the first optical element 22, and the second area 50B is disposed so as to surround the periphery of the first area 50A.

According to this configuration, it is possible to simplify the configuration of the first light emitting element 20 and the second light emitting element 26 compared to the structure in which the second area 50B is disposed at the center of the first optical element 22.

In the illumination device 2 according to the present embodiment, it is possible to adopt a configuration in which the first light emitting element 20 and the second light emitting element 26 are disposed so as to be opposed to each other across the first area 50A of the first optical element 22.

According to this configuration, since the first area 50A is disposed on the principal ray of the light emitted from the first light emitting element 20 and the principal ray of the light emitted from the second light emitting element 26, it is possible to reduce the size of the first area 50A.

The projector 1 according to the present embodiment is provided with the illumination device 2, the light modulation devices 4R, 4G, and 4B for modulating the light from the illumination device 2 in accordance with the image information, and the projection optical device 6 for projecting the light modulated by the light modulation devices 4R, 4G, and 4B.

According to the projector 1 related to the present embodiment, since there is provided the illumination device 2 which emits the illumination light L high in color reproducibility and is increased in light use efficiency, it is possible to provide the projector which is high in light efficiency, and displays an image high in color reproducibility.

Second Embodiment

A second embodiment of the present disclosure will hereinafter be described using the drawings.

A projector according to the second embodiment is substantially the same in configuration as that of the first embodiment, but is different in configuration of a part of the illumination device from that of the first embodiment. Therefore, the description of the overall configuration of the projector and a common configuration of the illumination device will be omitted. It should be noted that members and constituents common to the first embodiment will be denoted by the same reference symbols.

Figure 3:
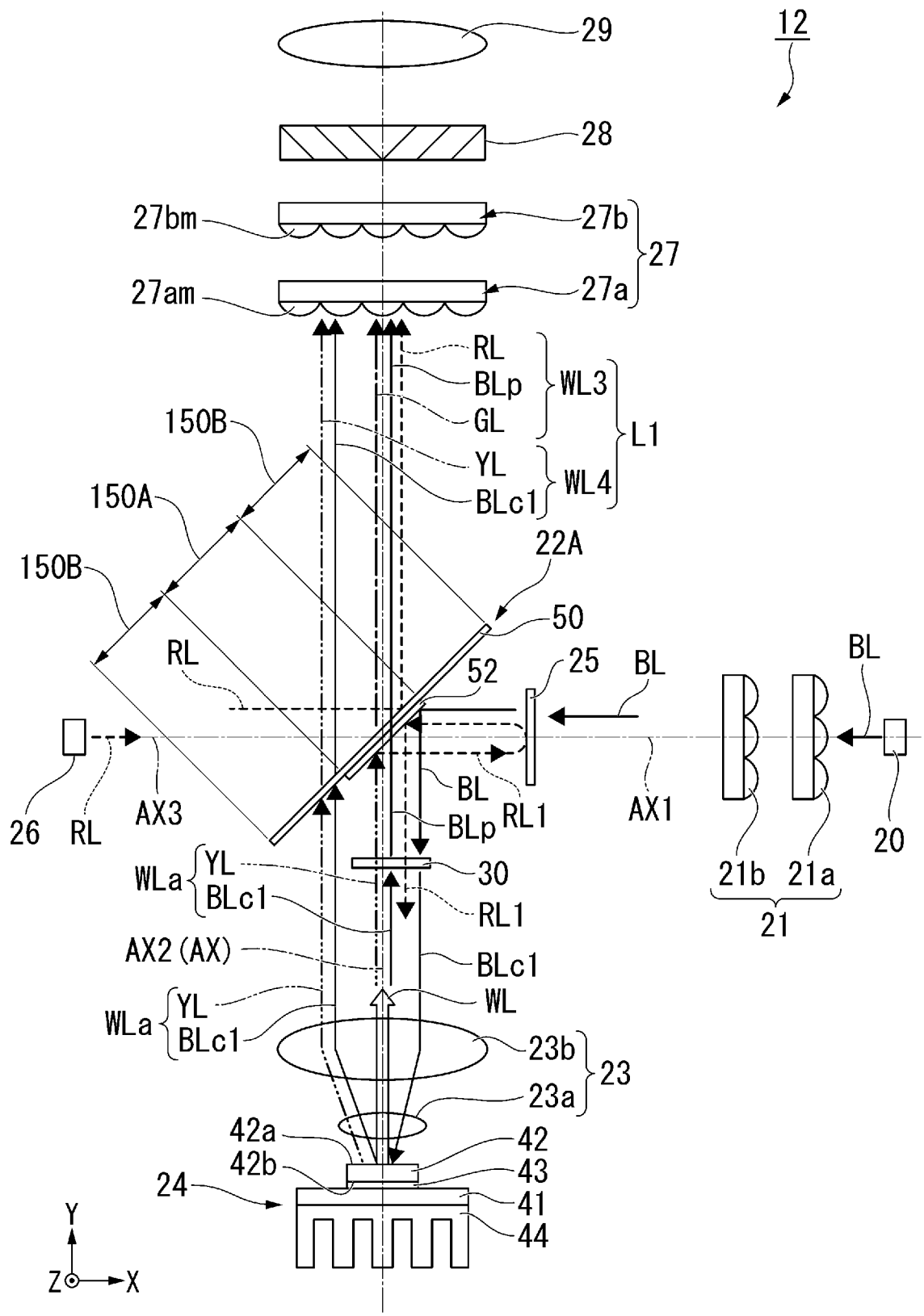
FIG. 3 is a schematic configuration diagram of an illumination device according to a second embodiment.

FIG. 3 is a schematic configuration diagram of an illumination device according to the second embodiment.

As shown in FIG. 3, the illumination device 12 according to the present embodiment is provided with the first light emitting element 20, the homogenizer optical system 21, a first optical element 22A, the pickup optical system 23, the wavelength conversion element 24, the second optical element 25, the second light emitting element 26, the integrator optical system 27, the polarization conversion element 28, the superimposing lens 29, and a third optical element 30. In the present embodiment, the third optical element 30 is disposed between the pickup optical system 23 and the first optical element 22A.

The first optical element 22A in the present embodiment has the transparent substrate 50, and a polarization beam splitter 52 disposed on one surface of the transparent substrate 50. The first optical element 22A in the present embodiment includes a first area 150A and a second area 150B. The first area 150A is formed of a region where the polarization beam splitter 52 is disposed out of the transparent substrate 50, and the second area 150B is formed of a region where the polarization beam splitter 52 is not disposed out of the transparent substrate 50.

The polarization beam splitter 52 has a color separation characteristic of reflecting the light in the blue wavelength band as a polarization component in a predetermined direction and the light in the red wavelength band, and transmitting the light in the green wavelength band. In the present embodiment, the blue light BL is linearly-polarized light polarized in a first direction. The polarization direction of the blue light BL coincides with the polarization direction of the polarized light (e.g., S-polarized light) to be reflected by the polarization beam splitter 52. In the present embodiment, the first area 150A provided with the polarization beam splitter 52 reflects the blue light BL emitted from the first light emitting element 20 and the red light RL emitted from the second light emitting element 26.

The blue light BL reflected by the first area 150A of the first optical element 22A enters the third optical element 30. The third optical element 30 is formed of a ¼ wave plate disposed in a light path between the polarization beam splitter 52 and the pickup optical system 23. Therefore, the blue light BL reflected by the first area 150A is transmitted through the third optical element 30 to thereby be converted into blue light BLc1 as circularly-polarized light, and then enters the pickup optical system 23.

The wavelength conversion element 24 converts apart of the blue light BLc1 into the fluorescence YL, diffuses another part of the blue light BLc1, and emits the result. In the present embodiment, an outer rim portion of light WLa including the fluorescence YL and the blue light BLc1 which are emitted from the wavelength conversion element 24, and then collimated by the pickup optical system 23 enters the second area 150B of the first optical element 22A. Since the second area 150B which is not provided with the polarization beam splitter 52 is formed of the transparent substrate 50, the blue light BLc1 and the fluorescence YL are transmitted through the second area 150B.

Meanwhile, the central portion of the light WLa which is emitted from the wavelength conversion element 24 and is collimated by the pickup optical system 23 enters the third optical element 30. Thus, the blue light BLc1 is converted into blue light BLp as P-polarized light, and then enters the first area 150A provided with the polarization beam splitter 52. It should be noted that the fluorescence YL as unpolarized light or non-polarized light is directly transmitted through the third optical element 30, and then enters the first area 150A.

The blue light BLp as the P-polarized light is transmitted through the first area 150A provided with the polarization beam splitter 52. It should be noted that the polarization beam splitter 52 reflects the red light RL in the second wavelength band emitted from the second light emitting element 26, and therefore, similarly reflects the red light RL1 included in the fluorescence YL. The red light RL1 reflected by the first area 150A is reflected by the second optical element 25, and then enters the wavelength conversion element 24 via the first area 150A, the third optical element 30, and the pickup optical system 23. The red light RL1 having returned to the wavelength conversion element 24 is scattered by the scattering element included in the wavelength conversion layer 42 to thereby be changed in proceeding direction, and is then emitted once again from the wavelength conversion element 24, and then passes through the second area 150B of the first optical element 22A to thereby be reused. Further, the red light RL1 having returned to the wavelength conversion element 24 has no chance of being absorbed or converted in wavelength by the wavelength conversion layer 42.

As described hereinabove, the illumination device 12 according to the present embodiment emits light WL3 which has a pale yellow color, and includes the red light RL, the green light GL, and the blue light BLc1 from the first area 150A of the first optical element 22A toward the integrator optical system 27, and emits light WL4 which has a white color, and includes the fluorescence YL and the blue light BLc1 from the second area 150B of the first optical element 22A toward the integrator optical system 27. Hereinafter, the light WL3 and the light WL4 are collectively referred to as illumination light L1.

Advantages of Second Embodiment

According also to the illumination device 12 related to the present embodiment, by using the red light RL emitted from the second light emitting element 26 as the illumination light L1, it is possible to generate the illumination light L1 supplemented with the red component which the illumination light L1 is lacking in with the fluorescence YL alone. Further, according to the illumination device 12 related to the present embodiment, the blue light BLc1 which is diffusely reflected by the wavelength conversion element 24 and enters the first area 150A can be used as the illumination light L1 by converting the polarization direction of the blue light BLc1 into that of the blue light BLp as P-polarized light. Therefore, in addition to the advantages obtained by the illumination device 2 according to the first embodiment, it is possible to obtain the advantage that the light use efficiency of the blue light BL emitted from the first light emitting element 20 is increased.

Third Embodiment

A third embodiment of the present disclosure will hereinafter be described using the drawings.

A projector according to the third embodiment is substantially the same in configuration as that of the first embodiment, but is different in configuration of a part of the illumination device from that of the first embodiment. Therefore, the description of the overall configuration of the projector and a common configuration of the illumination device will be omitted. It should be noted that members and constituents common to the first embodiment will be denoted by the same reference symbols.

Figure 4:
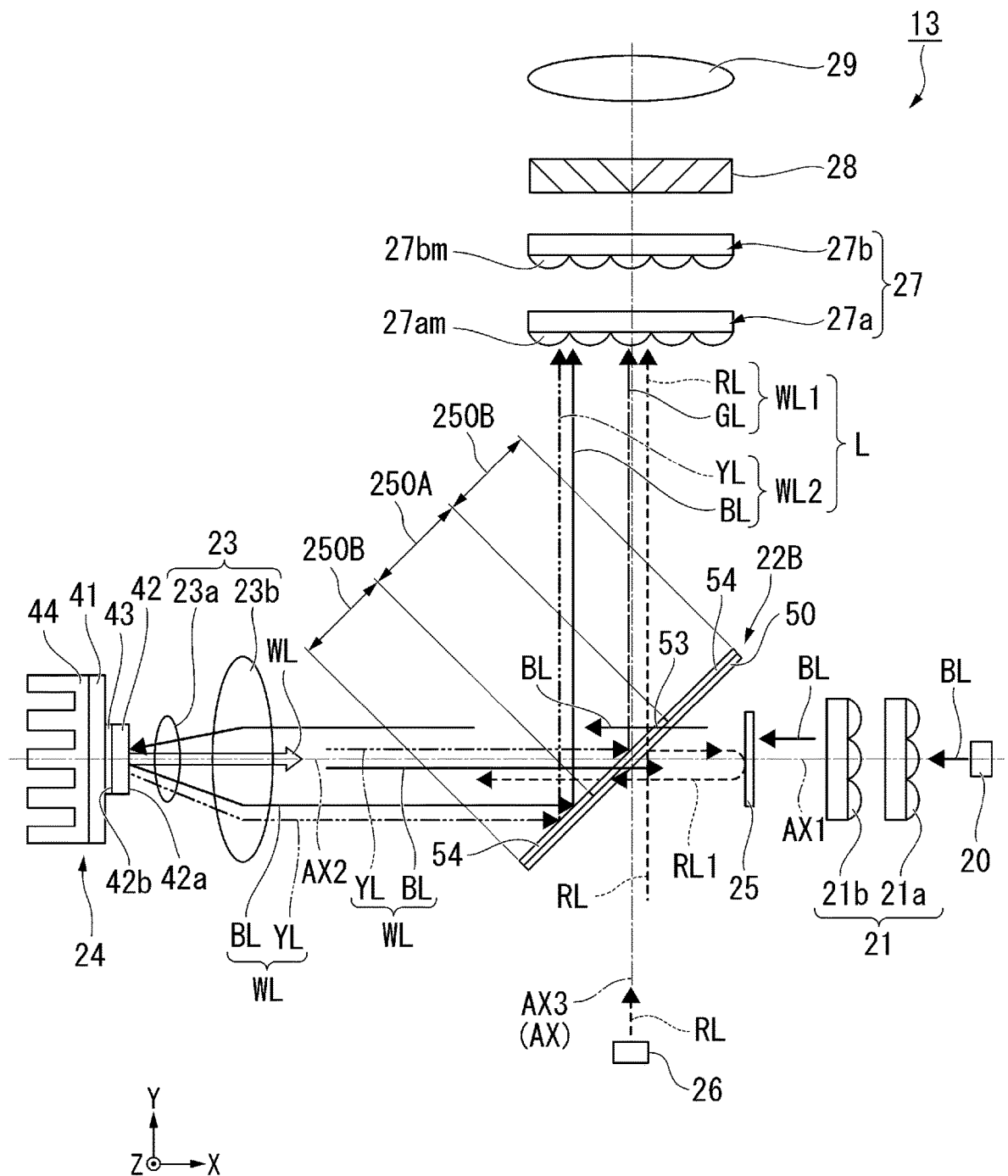
FIG. 4 is a schematic configuration diagram of an illumination device according to a third embodiment.

FIG. 4 is a schematic configuration diagram of an illumination device according to the third embodiment.

As shown in FIG. 4, the illumination device 13 according to the present embodiment is provided with the first light emitting element 20, the homogenizer optical system 21, a first optical element 22B, the pickup optical system 23, the wavelength conversion element 24, the second optical element 25, the second light emitting element 26, the integrator optical system 27, the polarization conversion element 28, and the superimposing lens 29.

In the illumination device 2 according to the first embodiment, the first optical element 22 has the first area 50A which reflects the blue light BL to enter the wavelength conversion element 24, reflects the red light RL1 having the second wavelength band out of the fluorescence YL, and reflects the red light RL, and the second area 50B for transmitting the blue light BL and the fluorescence YL.

In contrast, in the illumination device 13 according to the present embodiment, the first optical element 22B has a first area 250A which transmits the blue light BL to enter the wavelength conversion element 24, transmits the red light RL1 having the second wavelength band out of the fluorescence YL, and transmits the red light RL, and a second area 250B for reflecting the blue light BL and the fluorescence YL.

Therefore, in the case of the present embodiment, the optical axis AX1 of the first light emitting element 20 and the optical axis AX2 of the wavelength conversion element 24 are parallel to the X axis. The optical axis AX3 of the second light emitting element 26 is parallel to the Y axis. In the present embodiment, the optical axis AX1 of the first light emitting element 20 coincides with the optical axis AX2 of the wavelength conversion element 24. The optical axis AX3 of the second light emitting element 26 coincides with the illumination optical axis AX of the illumination device 13.

The first light emitting element 20, the homogenizer optical system 21, the second optical element 25, the first optical element 22B, the pickup optical system 23, and the wavelength conversion element 24 are disposed on the optical axes AX1, AX2. Further, the second light emitting element 26, the first optical element 22B, the integrator optical system 27, the polarization conversion element 28, and the superimposing lens 29 are disposed on the optical axis AX3.

The first optical element 22B in the present embodiment has the transparent substrate 50 having a light transmissive property, a dichroic mirror 53 disposed on one surface of the transparent substrate 50, and a mirror 54 disposed at both sides of the dichroic mirror 53. The first optical element 22B in the present embodiment includes the first area 250A and the second area 250B. The first area 250A is formed of a region where the dichroic mirror 53 is disposed out of the transparent substrate 50, and the second area 250B is formed of a region where the mirror 54 is disposed out of the transparent substrate 50.

The dichroic mirror 53 has a characteristic of transmitting the light in the blue wavelength band and the light in the red wavelength band while reflecting the light in the green wavelength band. Therefore, the dichroic mirror 53 transmits the blue light BL emitted from the first light emitting element 20 and the red light RL emitted from the second light emitting element 26.

In the present embodiment, the outer rim portion of the light WL including the fluorescence YL and the blue light BL which are emitted from the wavelength conversion element 24, and then collimated by the pickup optical system 23 enters the second area 250B of the first optical element 22B. The blue light BL and the fluorescence YL having entered the second area 250B are reflected by the mirror 54 provided to the second area 250B.

In the present embodiment, the blue light BL and the red light RL1 included in the central portion of the light WL emitted from the wavelength conversion element 24 are transmitted through the first area 250A of the first optical element 22B. It should be noted that the green light GL out of the fluorescence YL included in the central portion of the light WL is reflected by the first area 250A of the first optical element 22B.

The blue light BL and the red light RL1 transmitted through the first area 250A enter the second optical element 25. The second optical element 25 reflects the red light RL1 toward the dichroic mirror 53 provided to the first area 250A. The red light RL1 returns to the wavelength conversion element 24.

As described hereinabove, the illumination device 13 according to the present embodiment emits the light WL1 which has a yellow color, and includes the red light RL and the green light GL from the first area 250A of the first optical element 22B toward the integrator optical system 27, and emits the light WL2 which has a white color, and includes the fluorescence YL and the blue light BL from the second area 250B of the first optical element 22B toward the integrator optical system 27. In the present embodiment, the light WL1 and the light WL2 are collectively referred to as the illumination light L.

Advantages of Third Embodiment

Also in the illumination device 13 according to the present embodiment, substantially the same advantages as those of the illumination device 2 according to the first embodiment can be obtained. Specifically, by using the red light RL emitted from the second light emitting element 26 as the illumination light L, it is possible for the illumination device 13 to generate the illumination light L supplemented with the red component which the illumination light L is lacking in with the fluorescence YL alone. Further, it is possible to generate the illumination light L high in color reproducibility. Further, the illumination device 13 reflects the red light RL1 included in the fluorescence YL transmitted through the first area 250A with the second optical element 25 to return the red light RL1 to the wavelength conversion element 24. The red light RL1 having returned to the wavelength conversion element 24 is scattered by the scattering element included in the wavelength conversion layer 42 to thereby be changed in proceeding direction, and is then emitted once again from the wavelength conversion element 24, and then passes through the second area 250B of the first optical element 22B to thereby be reused. Further, the red light RL1 having returned to the wavelength conversion element 24 has no chance of being absorbed or converted in wavelength by the wavelength conversion layer 42.

Fourth Embodiment

A fourth embodiment of the present disclosure will hereinafter be described using the drawings.

A projector according to the fourth embodiment is substantially the same in configuration as that of the third embodiment, but is different in configuration of a part of the illumination device from that of the third embodiment. Therefore, the description of the overall configuration of the projector and a common configuration of the illumination device will be omitted. It should be noted that members and constituents common to the third embodiment will be denoted by the same reference symbols.

Figure 5:
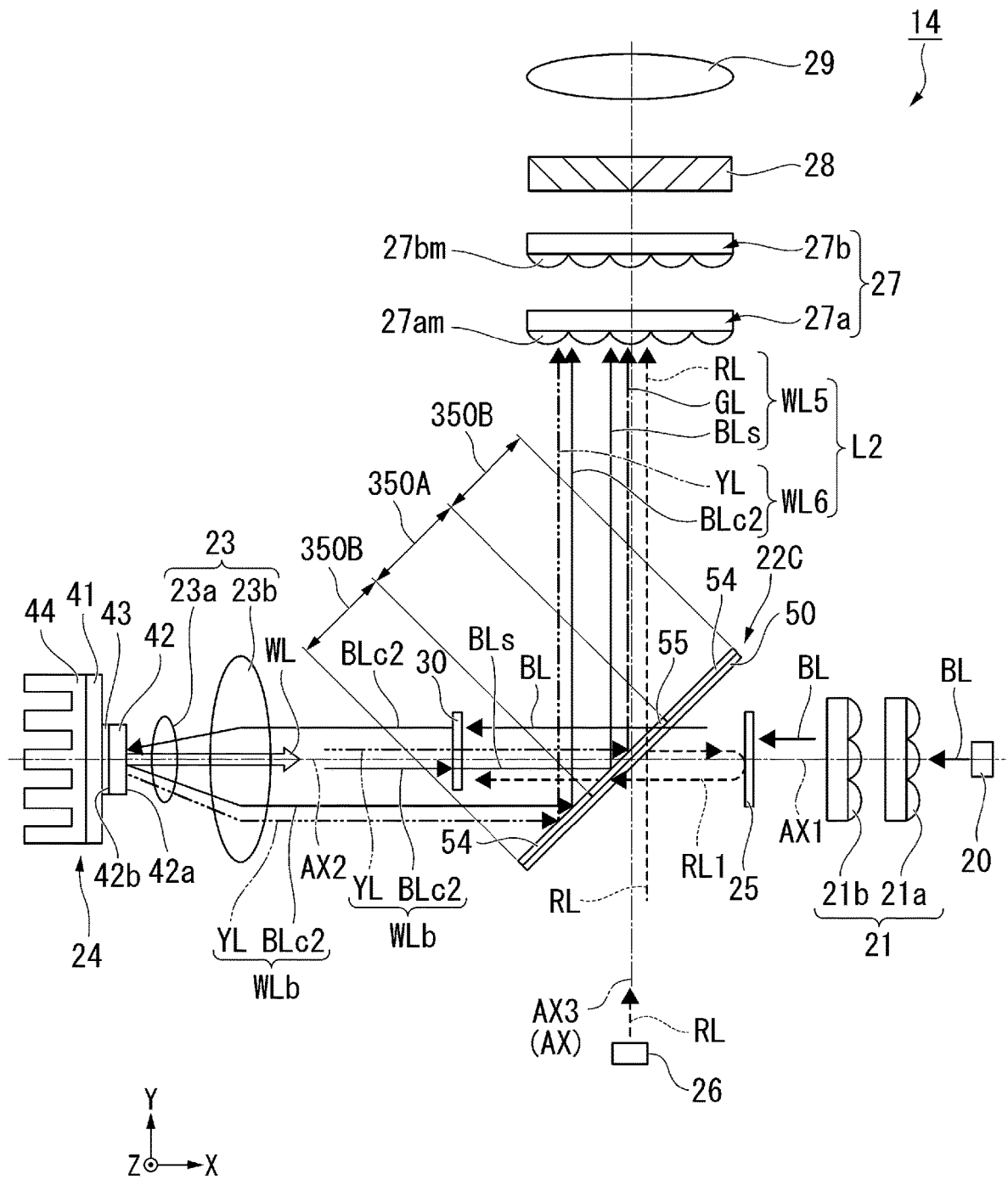
FIG. 5 is a schematic configuration diagram of an illumination device according to a fourth embodiment.

FIG. 5 is a schematic configuration diagram of an illumination device according to the fourth embodiment.

As shown in FIG. 5, the illumination device 14 according to the present embodiment is provided with the first light emitting element 20, the homogenizer optical system 21, a first optical element 22C, the pickup optical system. 23, the wavelength conversion element 24, the second optical element 25, the second light emitting element 26, the integrator optical system 27, the polarization conversion element 28, the superimposing lens 29, and the third optical element 30. In the present embodiment, the third optical element 30 is disposed between the pickup optical system 23 and the first optical element 22C.

The first optical element 22C in the present embodiment has the transparent substrate 50, a polarization beam splitter 55 disposed on one surface of the transparent substrate 50, and the mirror 54 disposed at both sides of the polarization beam splitter 55. The first optical element 22C in the present embodiment includes a first area 350A and a second area 350B. The first area 350A is formed of a region where the polarization beam splitter 55 is disposed out of the transparent substrate 50, and the second area 350B is formed of a region where the mirror 54 is disposed out of the transparent substrate 50.

The polarization beam splitter 55 has a color separation characteristic of transmitting the light in the blue wavelength band as a polarization component in a predetermined direction and the light in the red wavelength band, and reflecting the light in the green wavelength band. In the present embodiment, the polarization direction of the blue light BL coincides with the polarization direction (e.g., P-polarization component) to be transmitted through the polarization beam splitter 55. The first area 350A provided with the polarization beam splitter 55 transmits the blue light BL emitted from the first light emitting element 20 and the red light RL emitted from the second light emitting element 26.

The blue light BL transmitted through the first area 350A of the first optical element 22C is transmitted through the third optical element 30 to thereby be converted into blue light BLc2 as circularly-polarized light, and then enters the pickup optical system 23.

The wavelength conversion element 24 converts a part of the blue light BLc2 into the fluorescence YL, diffuses another part of the blue light BLc2, and emits the result. In the present embodiment, an outer rim portion of light WLb including the fluorescence YL and the blue light BLc2 which are emitted from the wavelength conversion element 24, and then collimated by the pickup optical system 23 enters the second area 350B of the first optical element 22C. The blue light BLc2 and the fluorescence YL having entered the second area 350B are reflected by the mirror 54.

Meanwhile, the central portion of the light WLb which is emitted from the wavelength conversion element 24 and is collimated by the pickup optical system 23 enters the third optical element 30. Thus, the blue light BLc2 is converted into blue light BLs as S-polarized light, and then enters the first area 350A provided with the polarization beam splitter 55. It should be noted that the fluorescence YL as unpolarized light or non-polarized light is directly transmitted through the third optical element 30, and then enters the first area 350A.

The blue light BLs as the S-polarized light is reflected by the first area 350A provided with the polarization beam splitter 55. It should be noted that the polarization beam splitter 55 transmits the red light RL in the second wavelength band emitted from the second light emitting element 26, and therefore, similarly reflects the red light RL1 included in the fluorescence YL. The red light RL1 transmitted through the first area 350A is reflected by the second optical element 25, and then enters the wavelength conversion element 24 via the first area 350A, the third optical element 30, and the pickup optical system 23. The red light RL1 having returned to the wavelength conversion element 24 is scattered by the scattering element included in the wavelength conversion layer 42 to thereby be changed in proceeding direction, and is then emitted once again from the wavelength conversion element 24, and then passes through the second area 350B of the first optical element 22C to thereby be reused. Further, the red light RL1 having returned to the wavelength conversion element 24 has no chance of being absorbed or converted in wavelength by the wavelength conversion layer 42.

As described hereinabove, the illumination device 14 according to the present embodiment emits light WL5 which has a pale yellow color, and includes the red light RL, the green light GL, and the blue light BLc2 from the first area 350A of the first optical element 22C toward the integrator optical system 27, and emits light WL6 which has a white color, and includes the fluorescence YL and the blue light BLc2 from the second area 350B of the first optical element 22C toward the integrator optical system 27. Hereinafter, the light WL5 and the light WL6 are collectively referred to as illumination light L2.

Advantages of Fourth Embodiment

According also to the illumination device 14 related to the present embodiment, by using the red light RL emitted from the second light emitting element 26 as the illumination light L2, it is possible to generate the illumination light L2 supplemented with the red component which the illumination light L2 is lacking in with the fluorescence YL alone. Further, according to the illumination device 14 related to the present embodiment, the blue light BLc2 which is diffusely reflected by the wavelength conversion element 24 and enters the first area 350A can be used as the illumination light L2 by converting the polarization direction of the blue light BLc2 into that of the blue light BLs as S-polarized light. Therefore, it is possible to increase the light use efficiency of the blue light BL emitted from the first light emitting element 20.

First Modified Example

Another aspect of the first optical element will hereinafter be described as a first modified example of the present disclosure using the drawings. The present modified example is a modified example of the first optical element 22 in the first embodiment. It should be noted that members common to the first embodiment will be denoted by the same reference symbols, and the detailed description thereof will be omitted.

Figure 6:
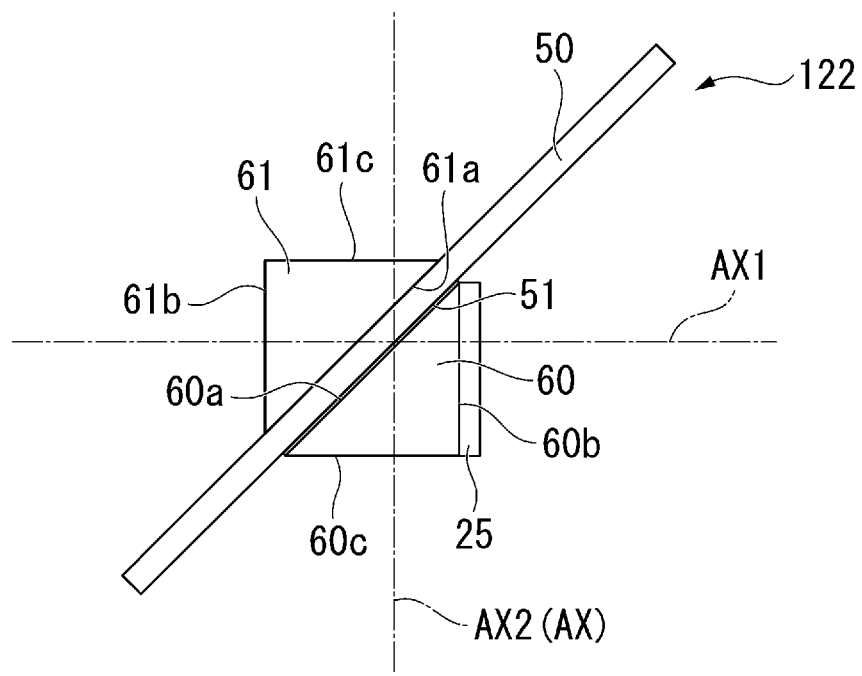
FIG. 6 is a configuration diagram of a principal part of a first optical element in a first modified example.

FIG. 6 is a configuration diagram of a principal part of a first optical element in the first modified example.

As shown in FIG. 6, a first optical element 122 in the present modified example has the transparent substrate 50, the dichroic mirror (an optical film) 51, a first prism member 60, and a second prism member 61.

In the present modified example, the first prism member 60 and the second prism member 61 are each formed of a triangular prism having an isosceles right triangular cross-sectional shape.

The first prism member 60 has a first side surface 60a, a second side surface 60b, and a third side surface 60c. The first side surface 60a is a side surface forming the hypotenuse of the triangular prism, and the second side surface 60b and the third side surface 60c are side surfaces forming two adjacent sides perpendicular to each other of the triangular prism. The second side surface 60b and the third side surface 60c each cross the first side surface 60a at an angle of 45 degrees. It should be noted that it is possible to form an AR coating film on each of the second side surface 60b and the third side surface 60c as needed.

The second prism member 61 has a first side surface 61a, a second side surface 61b, and a third side surface 61c. The first side surface 61a is a side surface forming the hypotenuse of the triangular prism, and the second side surface 61b and the third side surface 61c are side surfaces forming two adjacent sides perpendicular to each other of the triangular prism. The second side surface 61b and the third side surface 61c each cross the first side surface 61a at an angle of 45 degrees. It should be noted that it is possible to form an AR coating film on each of the second side surface 61b and the third side surface 61c as needed.

In the first optical element 122 in the present modified example, the dichroic mirror 51 is disposed on the first side surface 60a of the first prism member 60, and the second optical element 25 is disposed on the second side surface 60b of the first prism member 60. Specifically, the first prism member 60 functions as a support member for supporting the dichroic mirror 51 and the second optical element 25.

The first prism member 60 and the second prism member 61 are bonded to the transparent substrate via a transparent adhesive not shown. In other words, the transparent substrate 50 is sandwiched between the first prism member 60 and the second prism member 61. The dichroic mirror 51 is disposed between the first prism member 60 and the transparent substrate 50.

The first optical element 122 in the present modified example is configured so that the second side surface 60b of the first prism member 60 and the second side surface 61b of the second prism member 61 become parallel to each other, and the third side surface 60c of the first prism member 60 and the third side surface 61c of the second prism member 61 become parallel to each other.

The first optical element 122 in the present modified example is installed in the light path of the illumination device so that the optical axis AX2 and the second side surfaces 60b, 61b become parallel to each other, and the optical axis AX1 and the third side surfaces 60c, 61c become parallel to each other.

Advantages of First Modified Example

Since the second side surfaces 60b, 61b are parallel to each other, and the third side surfaces 60c, 61c are parallel to each other, it is easy for the first optical element 122 to be aligned with the optical axes AX1, AX2.

According to the first optical element 122 in the present modified example, it is arranged that the principal ray of the light enters or is emitted from each of the side surfaces 60b, 60c, 61b, and 61c of the first prism member 60 and the second prism member 61. Therefore, when adopting a structure of using the first prism member 60 and the second prism member 61, the light loss caused by a variation in proceeding direction of the light due to refraction and reflection of the light when being transmitted through each of the prism members 60, 61 can be prevented from occurring.

Further, in the first optical element 122 in the present modified example, the first prism member 60 functions as the support member for supporting the second optical element 25. According to this configuration, since the second optical element 25 and the dichroic mirror 51 are disposed close to each other, it is possible to make the red light RL1 reflected by the dichroic mirror 51 enter the second optical element 25 before the light flux of the red light RL1 spreads. Therefore, the light loss caused by the fact that the red light RL spreads to thereby fail to enter the second optical element 25 can be prevented from occurring.

For example, by bonding the first prism member 60 having the dichroic mirror 51 attached to the first side surface 60a and the second optical element 25 attached to the second side surface 60b, and the second prism member 61 to the transparent substrate 50, it is possible to manufacture the first optical element 122 in the present modified example. Therefore, the method of manufacturing the first optical element 122 becomes easy. It should be noted that it is also possible to directly form the dichroic mirror provided with the second optical element 25 on the second side surface 60b using evaporation.

Further, the present configuration can be applied to the first optical element 22A in the second embodiment. In this case, the dichroic mirror 51 in the first optical element 122 is replaced with the polarization beam splitter 52. It is possible to use the first prism member 60 as a support member for the third optical element 30. More specifically, it is possible to dispose the third optical element 30 on the third side surface 60c of the first prism member 60. According to this configuration, since the support member for the third optical element 30 becomes unnecessary, it is possible to prevent the number of components from increasing.

Second Modified Example

Another aspect of the first optical element will hereinafter be described as a second modified example of the present disclosure using the drawings. The present modified example is a modified example of the first optical element 22B in the third embodiment. It should be noted that members common to the third embodiment will be denoted by the same reference symbols, and the detailed description thereof will be omitted.

Figure 7:
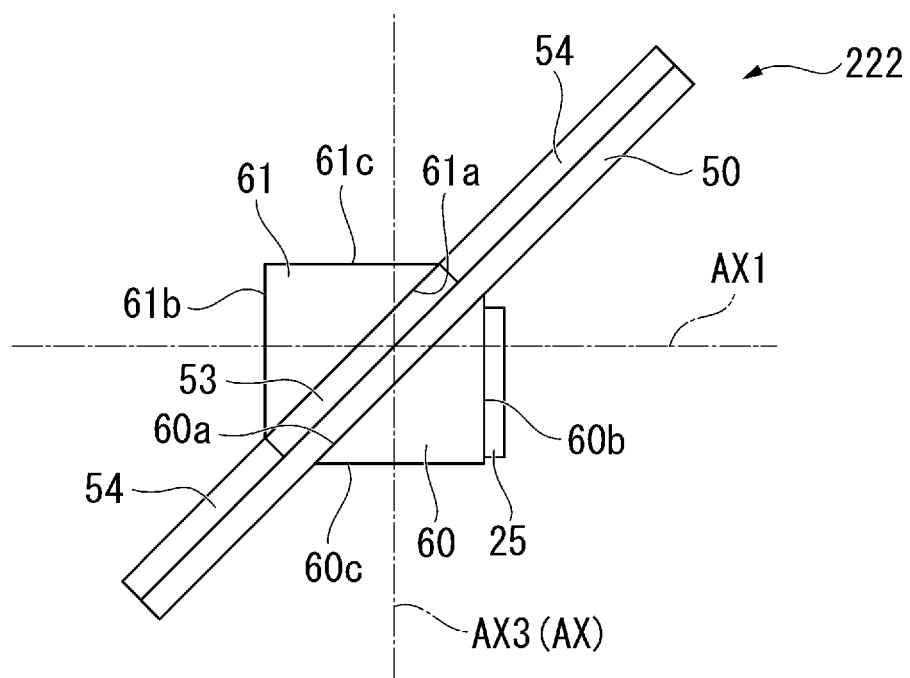
FIG. 7 is a configuration diagram of a principal part of a first optical element in a second modified example.

FIG. 7 is a configuration diagram of a principal part of a first optical element in the second modified example.

As shown in FIG. 7, a first optical element 222 in the present modified example has the transparent substrate 50, the dichroic mirror 53, the mirror 54, the first prism member 60, and the second prism member 61. In the present modified example, the dichroic mirror 53 is sandwiched between the second prism member 61 and the transparent substrate 50.

In the first optical element 222 in the present modified example, the dichroic mirror 53 is disposed on the first side surface 61a of the second prism member 61, and the second optical element 25 is disposed on the second side surface 60b of the first prism member 60.

In the present modified example, the first prism member 60 functions as a support member for supporting the second optical element 25, and the second prism member 61 functions as a support member for the dichroic mirror 53.

It should be noted that it is possible for the dichroic mirror 53 and the mirror 54 to be disposed at an opposite surface side, namely the first prism member 60 side, of the transparent substrate 50. In this case, the dichroic mirror 53 is disposed on the first side surface 60a of the first prism member 60. In this case, the first prism member 60 functions as a support member for supporting the second optical element 25 and the dichroic mirror 53, and the second prism member 61 functions as the support member for the dichroic mirror 53.

The first optical element 222 in the present modified example is installed in the light path of the illumination device so that the optical axis AX3 and the second side surfaces 60b, 61b become parallel to each other, and the optical axis AX1 and the third side surfaces 60c, 61c become parallel to each other.

It should be noted that the present configuration can be applied to the first optical element 22C in the fourth embodiment. In this case, the dichroic mirror 53 in the first optical element 222 is replaced with the polarization beam splitter 55. It is possible to use the second prism member 61 as a support member for the third optical element 30. More specifically, it is possible to dispose the third optical element 30 on the third side surface 60c of the first prism member 60. According to this configuration, since the support member for the third optical element 30 becomes unnecessary, it is possible to prevent the number of components from increasing.

Advantages of Second Modified Example

Also in the first optical element 222 in the present modified example, substantially the same advantages as those of the first modified example can be obtained. Specifically, it is easy for the first optical element 222 to be aligned with the optical axes AX1, AX3, and the light loss caused by refraction or reflection of the light when being transmitted through each of the prism members can be prevented from occurring.

Further, according to the first optical element 222 in the present modified example, for example, by bonding the first prism member 60 provided with the second optical element 25 and the second prism member 61 to the transparent substrate 50 provided with the mirror 54 and the dichroic mirror 53, it is possible to easily manufacture the first optical element 222.

Third Modified Example

Another aspect of the wavelength conversion element will hereinafter be described as a third modified example of the present disclosure using the drawings. It should be noted that members common to the embodiment described above will be denoted by the same reference symbols, and the detailed description thereof will be omitted.

Figure 8:
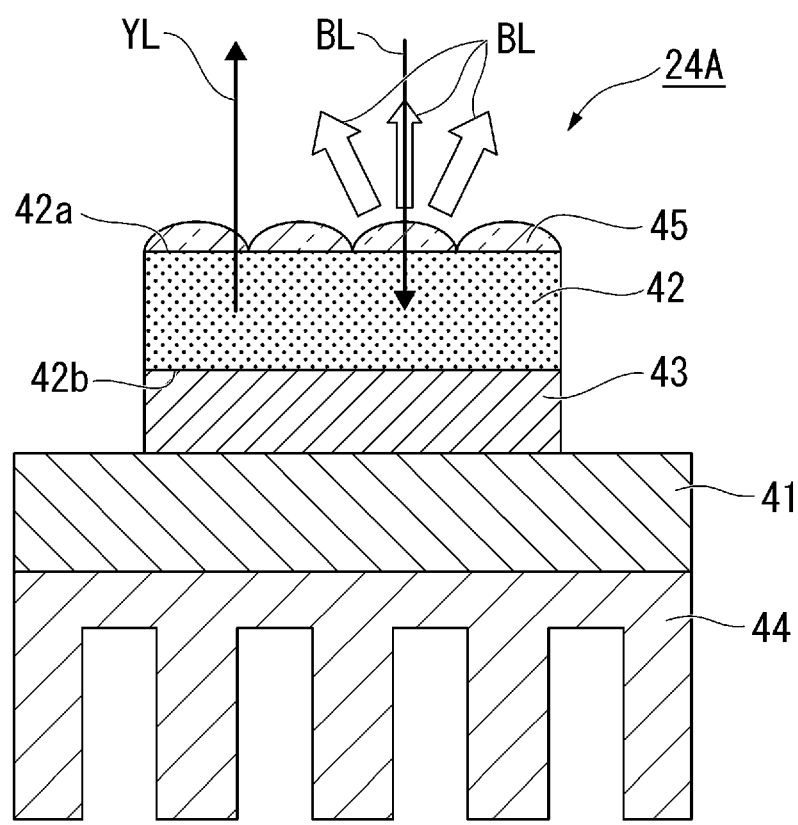
FIG. 8 is a cross-sectional view of a wavelength conversion element in a third modified example.

FIG. 8 is a cross-sectional view of a wavelength conversion element in the third modified example.

As shown in FIG. 8, the wavelength conversion element 24A in the present modified example is provided with the base member 41, the wavelength conversion layer 42, the reflecting layer 43, the heatsink 44, and a structure 45.

The structure 45 is disposed on the first surface 42a of the wavelength conversion layer 42. The structure 45 scatters apart of the blue light BL which enters the wavelength conversion element 24A, and then reflects the result toward an opposite direction to the incident direction of the blue light BL. The structure 45 is formed of a light transmissive material, and has a plurality of scattering structures. The scattering structures in the present embodiment each have a lens shape formed of a protruding part.

The structure 45 is formed separately from the wavelength conversion layer 42. A method of forming a dielectric body using, for example, an evaporation process, a sputtering process, a CVD process, or a coating process, and then processing the dielectric body using photolithography is suitable for the structure 45 in the present embodiment. It is desirable for the structure 45 to be formed of a material which is low in light absorption and is chemically stable. The structure 45 is formed of a material having a refractive index in a range of 1.3 through 2.5, and there can be used, for example, $SiO_2$, $SiON$, or $TiO_2$. For example, when forming the structure 45 using $SiO_2$, it is possible to accurately process the structure 45 using wet etching or dry etching.

Due to the configuration described above, a part of the blue light BL having entered the wavelength conversion element 24A is transmitted through the structure 45, and is then converted in wavelength by the wavelength conversion layer 42 into the fluorescence YL. Meanwhile, another part of the blue light BL is scattered backward by the structure 45 before converted in wavelength into the fluorescence YL, and is then emitted outside the wavelength conversion element 24A without being converted in wavelength. On this occasion, the blue light BL is emitted from the structure 45 in a state of being diffused into an angular distribution substantially the same as the angular distribution of the fluorescence YL.

It should be noted that it is possible for the structure 45 to integrally be formed on the surface of the wavelength conversion layer 42. In this case, it is possible to form the structure 45 by performing a texture treatment on the surface of the wavelength conversion layer 42. In this case, it possible for the structure 45 to perform the backscattering on a part of the blue light BL using the backscattering by the roughened surface.

Further, it is possible to configure the structure 45 by forming a number of convex surfaces or concave surfaces on the surface of the wavelength conversion layer 42 using a dimple treatment. In this case, it is possible for the structure 45 to perform the backscattering on a part of the blue light BL using the Fresnel reflection due to the surface provided with a number of convex surfaces. It should be noted that it is possible to dispose a reflection enhancing film not shown on a surface of the structure 45. In this case, it is possible to increase the blue light BL diffusely reflected by the structure 45.

Advantages of Third Modified Example

The wavelength conversion element 24A in the present modified example has the wavelength conversion layer 42 for converting the blue light BL into the fluorescence YL, the structure 45 which is disposed on the first surface 42a of the wavelength conversion layer 42, and which diffusely reflects another part of the blue light BL, and the reflecting layer 43 disposed on the second surface 42b of the wavelength conversion layer 42.

According to the wavelength conversion element 24A in the present modified example, since there is provided the structure 45, it is possible to perform the backscattering on apart of the blue light BL entering the wavelength conversion element 24A to emit the blue light BL in the state of being diffused into the angular distribution substantially the same as the angular distribution of the fluorescence YL.

It should be noted that the scope of the present disclosure is not limited to the embodiments described above, but a variety of modifications can be provided thereto within the scope or the spirit of the present disclosure.

For example, the stationary structure in which the wavelength conversion layer 42 does not move with respect to the blue light BL is adopted in the wavelength conversion element 24 in the embodiments described above, but it is possible to adopt a wheel type structure in which the wavelength conversion layer 42 rotates with respect to the blue light BL.

Besides the above, the specific descriptions of the shape, the number, the arrangement, the material, and so on of the constituents of the illumination device and the projector are not limited to those in the embodiments described above, but can arbitrarily be modified. Although in each of the embodiments, there is described the example of installing the illumination device according to the present disclosure in the projector using the liquid crystal light valves, the example is not a limitation. The illumination device according to the present disclosure can also be applied to a projector using digital micromirror devices as the light modulation devices. Further, the projector is not required to have a plurality of light modulation devices, and can be provided with just one light modulation device.

Although in each of the embodiments described above, there is described the example of applying the illumination device according to the present disclosure to the projector, the example is not a limitation. The illumination device according to the present disclosure can also be applied to lighting equipment, a headlight of a vehicle, and so on.

It is also possible for an illumination device according to an aspect of the present disclosure to have the following configuration.

The illumination device according to a first aspect of the present disclosure includes a first light emitting element configured to emit first light in a first wavelength band, a wavelength conversion element configured to convert a part of the first light into second light including a second wavelength band different from the first wavelength band and a third wavelength band different from the first wavelength band and the second wavelength band, diffuse another part of the first light, and emit a result, a second light emitting element configured to emit third light having the second wavelength band, a first optical element having a first area configured to reflect the first light to enter the wavelength conversion element, reflect fourth light having the second wavelength band out of the second light, and reflect the third light, and a second area configured to transmit the first light and the second light, and a second optical element configured to transmit the first light to enter the first optical element, and reflect the fourth light to enter the wavelength conversion element via the first area.

In the illumination device according to the first aspect of the present disclosure, there may be adopted a configuration in which there is further included a third optical element configured to convert light polarized in a first direction into circularly-polarized light, wherein the first light is the light polarized in the first direction, the first area reflects the first light polarized in the first direction to enter the third optical element, and the third optical element converts the first light reflected by the first area into the circularly-polarized light.

In the illumination device according to the first aspect of the present disclosure, there may be adopted a configuration in which the first optical element includes a first prism member, a second prism member, a transparent substrate sandwiched between the first prism member and the second prism member, and an optical film, the optical film is disposed one of between the first prism member and the transparent substrate, and between the second prism member and the transparent substrate, the optical film is disposed in the first area, and the first prism member supports the second optical element.

In the illumination device according to the first aspect of the present disclosure, there may be adopted a configuration in which the first light emitting element and the second light emitting element are disposed so as to be opposed to each other across the first area of the first optical element.

The illumination device according to a second aspect of the present disclosure includes a first light emitting element configured to emit first light in a first wavelength band, a wavelength conversion element configured to convert a part of the first light into second light having a second wavelength band different from the first wavelength band and a third wavelength band different from the first wavelength band and the second wavelength band, diffuse another part of the first light, and emit a result, a second light emitting element configured to emit third light having the second wavelength band, a first optical element having a first area configured to transmit the first light to enter the wavelength conversion element, transmit fourth light having the second wavelength band out of the second light, and transmit the third light, and a second area configured to reflect the first light and reflect the second light, and a second optical element configured to transmit the first light to enter the first optical element, and reflect the fourth light to enter the wavelength conversion element via the first area.

In the illumination device according to the second aspect of the present disclosure, there may be adopted a configuration in which there is further included a third optical element configured to convert light polarized in a first direction into circularly-polarized light, wherein the first light is the light polarized in the first direction, the first area transmits the first light polarized in the first direction to enter the third optical element, and the third optical element converts the first light transmitted through the first area into the circularly-polarized light.

In the illumination device according to the second aspect of the present disclosure, there may be adopted a configuration in which the first optical element includes a first prism member, a second prism member, a transparent substrate sandwiched between the first prism member and the second prism member, an optical film, and a reflecting mirror, the optical film is disposed one of between the first prism member and the transparent substrate, and between the second prism member and the transparent substrate, the optical film is disposed in the first area, the reflecting mirror is disposed in the second area, and the first prism member supports the second optical element.

In the illumination device according to one of the aspects of the present disclosure, there may be adopted a configuration in which the first area is disposed at a center of the first optical element, and the second area is disposed so as to surround a periphery of the first area.

In the illumination device according to one of the aspects of the present disclosure, there may be adopted a configuration in which the wavelength conversion element includes a wavelength conversion layer configured to convert the first light into the second light, a structure which is provided to a first surface of the wavelength conversion layer, and diffusely reflects another part of the first light, and a reflecting layer provided to a second surface of the wavelength conversion layer.

A projector according to still another aspect of the present disclosure may have the following configuration.

The projector according to still another aspect of the present disclosure includes the illumination device according to one of the above aspects of the present disclosure, a light modulation device configured to modulate light from the illumination device in accordance with image information, and a projection optical device configured to project the light modulated by the light modulation device.

What is claimed is:
1. An illumination device comprising:
a first light emitting element configured to emit first light in a first wavelength band;
a wavelength conversion element configured to convert a part of the first light into second light including a second wavelength band different from the first wavelength band and a third wavelength band different from the first wavelength band and the second wavelength band, diffuse another part of the first light, and emit a result;
a second light emitting element configured to emit third light having the second wavelength band;
a first optical element having a first area configured to reflect the first light to enter the wavelength conversion element, reflect fourth light having the second wavelength band out of the second light, and reflect the third light, and a second area configured to transmit the first light and the second light; and
a second optical element configured to transmit the first light to enter the first optical element, and reflect the fourth light to enter the wavelength conversion element via the first area.
2. The illumination device according to claim 1, further comprising:
a third optical element configured to convert light polarized in a first direction into circularly-polarized light, wherein
the first light is the light polarized in the first direction,
the first area reflects the first light polarized in the first direction to enter the third optical element, and
the third optical element converts the first light reflected by the first area into the circularly-polarized light.
3. The illumination device according to claim 1, wherein
the first optical element includes a first prism member, a second prism member, a transparent substrate sandwiched between the first prism member and the second prism member, and an optical film,
the optical film is disposed one of between the first prism member and the transparent substrate, and between the second prism member and the transparent substrate,
the optical film is disposed in the first area, and
the first prism member supports the second optical element.
4. The illumination device according to claim 1, wherein
the first light emitting element and the second light emitting element are disposed so as to be opposed to each other across the first area of the first optical element.
5. An illumination device comprising:
a first light emitting element configured to emit first light in a first wavelength band;
a wavelength conversion element configured to convert a part of the first light into second light having a second wavelength band different from the first wavelength band and a third wavelength band different from the first wavelength band and the second wavelength band, diffuse another part of the first light, and emit a result;
a second light emitting element configured to emit third light having the second wavelength band;
a first optical element having a first area configured to transmit the first light to enter the wavelength conversion element, transmit fourth light having the second wavelength band out of the second light, and transmit the third light, and a second area configured to reflect the first light, and reflect the second light; and
a second optical element configured to transmit the first light to enter the first optical element, and reflect the fourth light to enter the wavelength conversion element via the first area.
6. The illumination device according to claim 5, further comprising:
a third optical element configured to convert light polarized in a first direction into circularly-polarized light, wherein
the first light is the light polarized in the first direction,
the first area transmits the first light polarized in the first direction to enter the third optical element, and
the third optical element converts the first light transmitted through the first area into the circularly-polarized light.
7. The illumination device according to claim 5, wherein
the first optical element includes a first prism member, a second prism member, a transparent substrate sandwiched between the first prism member and the second prism member, an optical film, and a reflecting mirror,
the optical film is disposed one of between the first prism member and the transparent substrate, and between the second prism member and the transparent substrate,
the optical film is disposed in the first area,
the reflecting mirror is disposed in the second area, and the first prism member supports the second optical element.

8. The illumination device according to claim 1, wherein the first area is disposed at a center of the first optical element, and
the second area is disposed so as to surround a periphery of the first area.

9. The illumination device according to claim 1, wherein the wavelength conversion element includes
- a wavelength conversion layer configured to convert the first light into the second light,
- a structure which is provided to a first surface of the wavelength conversion layer, and diffusely reflects another part of the first light, and
- a reflecting layer provided to a second surface of the wavelength conversion layer.

10. A projector comprising:
the illumination device according to claim 1;
a light modulation device configured to modulate light from the illumination device in accordance with image information; and
a projection optical device configured to project the light modulated by the light modulation device.

* * * * *